US008992673B2

(12) United States Patent
Mani

(10) Patent No.: US 8,992,673 B2
(45) Date of Patent: Mar. 31, 2015

(54) EVAPORATED FUEL TREATMENT APPARATUS

(71) Applicant: Aisan Kogyo Kabushiki Kaisha, Aichi-ken (JP)

(72) Inventor: Takashi Mani, Hekinan (JP)

(73) Assignee: Aisan Kogyo Kabushiki Kaisha (JP)

( * ) Notice: Subject to any disclaimer, the term of this patent is extended or adjusted under 35 U.S.C. 154(b) by 85 days.

(21) Appl. No.: 13/719,422

(22) Filed: Dec. 19, 2012

(65) Prior Publication Data

US 2013/0160651 A1    Jun. 27, 2013

(30) Foreign Application Priority Data

Dec. 26, 2011    (JP) ................................. 2011-283917

(51) Int. Cl.
*F02M 25/08* (2006.01)
*B01D 53/04* (2006.01)
*F02M 35/02* (2006.01)

(52) U.S. Cl.
CPC .... *F02M 35/0218* (2013.01); *B01D 2259/4148* (2013.01); *B01D 2253/311* (2013.01); *B01D 2253/308* (2013.01); *B01D 2259/4145* (2013.01); *B01D 2259/4143* (2013.01); *B01D 53/04* (2013.01); *F02M 25/0854* (2013.01)
USPC .................. 96/132; 96/133; 96/153

(58) Field of Classification Search
CPC ........... F02M 25/0854; F02M 35/0218; B01D 53/04; B01D 2253/102; B01D 2253/308; B01D 2253/311; B01D 2257/702; B01D 2259/4143; B01D 2259/4145; B01D 2259/4148

USPC .............. 95/146; 96/108, 121, 132, 133, 147, 96/153; 123/519
See application file for complete search history.

(56) References Cited

U.S. PATENT DOCUMENTS

| 5,170,765 | A | * | 12/1992 | Hoshino et al. ................ 123/520 |
| 5,564,398 | A | * | 10/1996 | Maeda et al. .................. 123/520 |
| 6,540,815 | B1 | | 4/2003 | Hiltzik et al. |
| 6,695,896 | B2 | * | 2/2004 | Hara et al. ....................... 96/121 |
| 6,793,718 | B2 | * | 9/2004 | Mochizuki et al. ............. 96/108 |

(Continued)

FOREIGN PATENT DOCUMENTS

| JP | H10-286458 A | 10/1998 |
| JP | A-2000-303917 | 10/2000 |

(Continued)

OTHER PUBLICATIONS

Office Action mailed on Jan. 6, 2015 in corresponding Japanese patent application No. 2011-283917.

*Primary Examiner* — Frank Lawrence
(74) *Attorney, Agent, or Firm* — Wood, Phillips, Katz, Clark & Mortimer

(57) ABSTRACT

In an evaporated fuel treatment apparatus, for reducing blow-by of an evaporated fuel component to the outside, the evaporated fuel treatment apparatus includes at least one adsorption chamber filled with a first adsorbent and a second adsorbent that adsorb and desorb a fuel component of evaporated fuel, and the first adsorbent has a higher pore volume than the second adsorbent with respect to effective pores that effectively adsorb and desorb a low-boiling fuel component, and the first adsorbent has a lower pore volume than the second adsorbent with respect to pores smaller than the effective pores and having higher adsorbability and lower desorbability on butane than the effective pores.

8 Claims, 4 Drawing Sheets

(56) References Cited

U.S. PATENT DOCUMENTS

| | | |
|---|---|---|
| 7,008,470 B2 | 3/2006 | Makino et al. |
| 7,008,471 B2 * | 3/2006 | Koyama et al. ............... 96/131 |
| 7,305,974 B2 * | 12/2007 | Nakano ...................... 123/519 |
| 7,323,041 B2 * | 1/2008 | Yoshida et al. ............... 96/132 |
| 7,507,278 B2 | 3/2009 | Makino et al. |
| 7,998,257 B2 | 8/2011 | Makino et al. |
| 2001/0015134 A1 * | 8/2001 | Uchino et al. ............... 96/130 |
| 2002/0078931 A1 | 6/2002 | Makino et al. |
| 2004/0261777 A1 * | 12/2004 | Ogawa ...................... 123/698 |
| 2009/0013973 A1 * | 1/2009 | Yamasaki ................... 123/519 |
| 2009/0090243 A1 * | 4/2009 | Makino et al. ............... 96/132 |

FOREIGN PATENT DOCUMENTS

| | | |
|---|---|---|
| JP | A-2002-256989 | 9/2002 |
| JP | A-2007-2709 | 1/2007 |
| JP | 2009-079595 A | 4/2009 |
| JP | 2009-127603 A | 6/2009 |

* cited by examiner

EVAPORATED FUEL TREATMENT APPARATUS

BACKGROUND OF THE INVENTION

1. Field of the Invention

The present invention relates to an evaporated fuel treatment apparatus.

2. Background Art

Conventionally, there has been used an evaporated fuel treatment apparatus (hereinafter also referred to as a canister) which temporarily adsorbs a fuel component of evaporated fuel in order to prevent the evaporated fuel from being emitted into the atmosphere from an automobile fuel tank or the like.

In recent years, there has been a demand for the canister to reduce emission of evaporated fuel into the atmosphere. To reduce the emission of evaporated fuel into the atmosphere as described above, as activated carbon filled in the canister, activated carbon has been known, in which the percentage of pores having a diameter of 20 Å or less, in which butane tends to remain, is 20% or less of pores having a diameter of 100 Å or less, and the percentage of pores having a diameter of more than 20 Å to 25 Å or less, which is effective to adsorb a low-boiling gas component, is 15 to 25% of the pores having a diameter of 100 Å or less (see JP-2007-2709 A).

In the activated carbon according to the related art, the volume of the pores of 20 Å or less, in which butane tends to remain, is reduced to be as little as ever.

However, the present applicant focused on the fact that the pores of 20 Å or less, in which butane tends to remain, can effectively suppress leakage of a low-boiling fuel component such as butane to the atmosphere from the evaporated fuel treatment apparatus since the pores of 20 Å or less have low desorbability on the butane but also have high adsorbability on the butane. It is thus an object of the present invention to provide an evaporated fuel treatment apparatus which can further reduce blow-by of an evaporated fuel component to the outside from the evaporated fuel treatment apparatus.

SUMMARY OF THE INVENTION

To achieve the above object, an evaporated fuel treatment apparatus according to the present invention includes at least one adsorption chamber filled with a first adsorbent and a second adsorbent that adsorb and desorb a fuel component of evaporated fuel, wherein the first adsorbent has a higher pore volume than the second adsorbent with respect to effective pores that effectively adsorb and desorb a low-boiling fuel component, and the first adsorbent has a lower pore volume than the second adsorbent with respect to pores smaller than the effective pores and having higher adsorbability and lower desorbability on butane than the effective pores.

In the present invention, the evaporated fuel treatment apparatus may further include at least one adsorption chamber filled with an adsorbent that adsorbs and desorbs a fuel component of evaporated fuel, wherein the at least one adsorption chamber filled with the first adsorbent and the second adsorbent may be provided on an atmospheric port side.

In the present invention, the adsorption chamber filled with the first adsorbent and the second adsorbent and provided closest to the atmospheric port side may be filled with the first adsorbent, the second adsorbent, and further granulated material having no adsorption capacity on the fuel component.

In the present invention, a plurality of adsorption chambers may be provided as the at least one adsorption chamber filled with the first adsorbent and the second adsorbent, the adsorption chambers may be sequentially arranged in series, and a space chamber not filled with the adsorbent may be provided between adjacent adsorption chambers in the series of the adsorption chambers.

In the present invention, a plurality of adsorption chambers may be provided as the at least one adsorption chamber filled with the first adsorbent and the second adsorbent, and may have different mixture ratios between the first adsorbent and the second adsorbent such that a percentage of the second adsorbent mixed therein increases toward the atmospheric port side.

In the present invention, the first adsorbent may have a lower pore volume than the second adsorbent with respect to pores larger than the effective pores.

In the present invention, coal-based activated carbon may be used as the first adsorbent, and wood-based activated carbon may be used as the second adsorbent.

In the present invention, the evaporated fuel treatment apparatus may include a canister main body and a trap canister connected to a port of the canister main body on an atmosphere side, and the at least one adsorption chamber filled with the first adsorbent and the second adsorbent that adsorb and desorb the fuel component of the evaporated fuel may be provided in the trap canister.

As described above, two types of adsorbents: the first adsorbent having a high percentage of effective pores that effectively adsorb and desorb the low-boiling fuel component, and the second adsorbent having pores smaller than the effective pores and higher adsorbability on butane than the effective pores are used. Accordingly, the evaporated fuel component can be more effectively adsorbed and retained as compared to a case in which activated carbon according to the related art is used, and leakage of the evaporated fuel component from the evaporated fuel treatment apparatus to the atmosphere can be suppressed. Blow-by reducing performance can be thereby improved.

DETAILED DESCRIPTION OF THE PREFERRED EMBODIMENT

Embodiments for carrying out the present invention will be described based on the drawings.

First Embodiment

Figure 1:
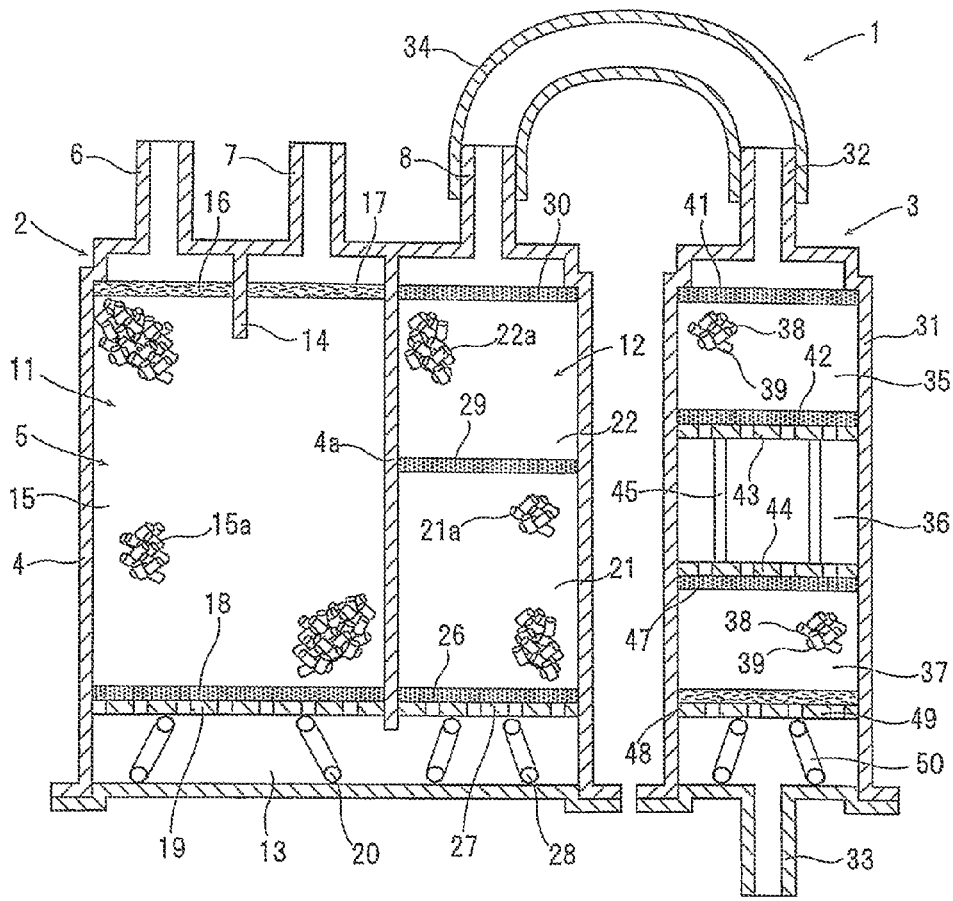
FIG. 1 is a schematic sectional view of an evaporated fuel treatment apparatus according to a first embodiment of the present invention.
Figure 2:
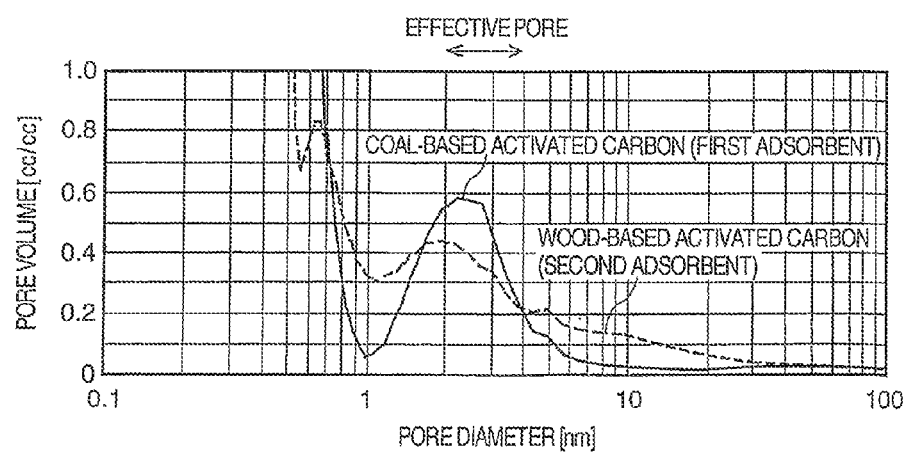
FIG. 2 is a graph showing a relationship between a pore volume and a pore diameter of coal-based activated carbon and wood-based activated carbon used in the first embodiment of the present invention.

FIGS. 1 and 2 show a first embodiment according to the present invention.

An evaporated fuel treatment apparatus 1 according to the present invention includes a canister main body 2 and a trap canister 3 as shown in FIG. 1.

The canister main body 2 has a body case 4. A passage 5 in which a fluid can flow is formed inside the body case 4. As shown in FIG. 1, a tank port 6 and a purge port 7 are formed at one end of the passage 5, and a port 8 on an atmosphere side is formed at the other end of the passage 5 in the body case 4.

A main chamber 11 in communication with the tank port 6 and the purge port 7, and a sub-chamber 12 in communication with the atmosphere-side port 8 are formed in the case 4. The main chamber 11 and the sub-chamber 12 are divided by a partition wall 4a. The main chamber 11 and the sub-chamber 12 communicate with each other through a space 13 that is formed in the body case 4 on the opposite side to the atmosphere-side port 8. When a gas flows toward the atmosphere-side port 8 from the tank port 6, the gas turns back in the space 13 to flow in a substantially-U shape.

The tank port 6 communicates with an upper air chamber of a fuel tank via a valve (not shown). The purge port 7 is connected to an intake passage of an engine via a purge control valve (VSV) and a purge passage (not shown). An opening degree of the purge control valve is controlled by an electronic control unit (ECU), and the purge control is performed during engine operation.

A baffle plate 14 that reaches to a portion of a first adsorption chamber 15 described below from an inner side surface of the case 4 is provided between the tank port 6 and the purge port 7 in the body case 4. The baffle plate 14 allows a fluid flowing between the tank port 6 and the purge port 7 to flow through the first adsorption chamber 15 described below.

The first adsorption chamber 15 filled with activated carbon 15a at a predetermined density is provided in the main chamber 11. The activated carbon 15a in the first adsorption chamber 15 is made of granulated coal having a predetermined average particle size. The activated carbon 15a may be made of fractured coal. The activated carbon 15a may be also made of one type of activated carbon, or plural types of activated carbon by mixture.

The first adsorption chamber 15 is covered with a filter 16 made of nonwoven fabric or the like on the tank port 6 side, and a filter 17 made of nonwoven fabric or the like on the purge port 7 side. As shown in FIG. 1, a filter 18 made of urethane or the like is also provided on a lower surface of the first adsorption chamber 15 so as to cover the entire lower surface. A plate 19 having a plurality of communication holes is provided on a lower side of the filter 18. The plate 19 is urged toward the tank port 6 by an urging member 20 such as a spring.

In the sub-chamber 12, a second adsorption chamber 21 filled with activated carbon 21a at a predetermined density and a third adsorption chamber 22 filled with activated carbon 22a at a predetermined density are provided in series sequentially from the tank port 6 side. The activated carbons 21a and 22a are made of granulated coal having a predetermined average particle size. The activated carbons 21a and 22a may be made of fractured coal. The activated carbons 21a and 22a may be also made of one type of activated carbon, or plural types of activated carbon by mixture.

A filter 26 made of urethane or the like is provided in the second adsorption chamber 21 on the space 13 side so as to cover the entire surface. A plate 27 where a plurality of communication holes are formed substantially evenly over the entire surface is provided on the filter 26 on the space 13 side. The plate 27 is urged toward the port 8 by an urging member 28 such as a spring.

A filter 29 made of urethane or the like is provided between the second adsorption chamber 21 and the third adsorption chamber 22. A filter 30 made of urethane or the like is provided in the third adsorption chamber 22 on the port 8 side so as to cover the entire surface.

Next, the trap canister 3 will be described in detail.

The trap canister 3 has a case 31. A body-side port 32 is provided on the canister main body 2 side, and an atmospheric port 33 is provided on the opposite side thereto in the case 31. The body-side port 32 and the port 8 of the canister main body 2 are connected through a hose 34. A fourth adsorption chamber 35, a space chamber 36, and a fifth adsorption chamber 37 are formed in the case 31 sequentially from the canister main body 2 side.

The fourth adsorption chamber 35 is filled with a first adsorbent 38 and a second adsorbent 39 at a ratio of 7 to 3 at a predetermined density. The first adsorbent 38 is composed of coal-based activated carbon that can adsorb and desorb a fuel component of evaporated fuel. The second adsorbent 39 is composed of wood-based activated carbon that can adsorb and desorb a fuel component of evaporated fuel. The fifth adsorption chamber 37 is filled with the first adsorbent 38 and the second adsorbent 39 at a ratio of 3 to 7 at a predetermined density. The space chamber 36 is not filled with the activated carbon.

As shown in FIG. 2, the first adsorbent 38 of coal-based activated carbon has a higher pore volume than the second adsorbent 39 of wood-based activated carbon with respect to pores having a pore diameter of 2 nm to 3 nm (referred to as effective pores below) determined by the Barrett-Joyner-Halenda (BJH) method using a nitrogen adsorption method that is effective in adsorbing and desorbing a low-boiling fuel component such as butane. The second adsorbent 39 has a higher pore volume than the first adsorbent 38 with respect to pores smaller than the effective pores, with a pore diameter of 1 nm to 2 nm determined by the BJH method, and having higher adsorbability and lower desorbability on the butane than the effective pores. Moreover, the second adsorbent 39 has a higher pore volume than the first adsorbent 38 with respect to pores larger than the effective pores, with a pore diameter of 3 nm or more determined by the BJH method, and having lower adsorbability and higher desorbability on the butane than the effective pores.

As described above, it is understandable that while the first adsorbent 38 made of coal-based activated carbon has a concentrated pore distribution around the effective pores within a pore range in which the fuel component can be adsorbed and desorbed, the second adsorbent 39 of wood-based activated carbon has a gentler and more widespread pore distribution than the first adsorbent 38 within the pore range in which the fuel component can be adsorbed and desorbed. The first adsorbent 38 and the second adsorbent 39 preferably have substantially the same particle size as to be homogeneously mixed together.

In addition to the coal-based activated carbon and the wood-based activated carbon, adsorbents of any type of activated carbon may be used for the first adsorbent 38 and the second adsorbent 39 as long as the adsorbents provide such a relationship that the first adsorbent 38 has a higher pore volume than the second adsorbent 39 with respect to the effective pores, and the second adsorbent 39 has a higher pore volume than the first adsorbent 38 with respect to the pores having higher adsorbability and lower desorbability on the butane than the effective pores and having a pore diameter of 1 nm to 2 nm, and the absorbents can also adsorb and desorb the evaporated fuel component as described above. Although the canister main body 2 is filled with the activated carbons 15a, 21a, and 22a in the first embodiment, any adsorbent may be used instead of the activated carbons 15a, 21a, and 22a as long as the adsorbent can adsorb and desorb the evaporated fuel component.

The first adsorbent 38 and the second adsorbent 39 may be mixed at any mixture ratio. However, the fifth adsorption chamber 37 located on the atmospheric port 33 side preferably has a higher percentage of the second adsorbent 39 having lower desorbability and higher adsorbability on butane than the fourth adsorption chamber 35.

A filter 41 made of urethane or the like is provided in the fourth adsorption chamber 35 on the canister main body 2 side so as to cover the entire surface. A filter 42 made of urethane or the like is provided in the fourth adsorption chamber 35 on the atmospheric port 33 side so as to cover the entire surface.

Plates 43 and 44 where a plurality of communication holes are formed substantially evenly over the entire surfaces are provided in both side portions of the space chamber 36 on the fourth adsorption chamber 35 side and the fifth adsorption chamber 37 side. The plates 43 and 44 are connected through a plate-like space adjustment member 45.

A filter 47 made of urethane or the like is provided in the fifth adsorption chamber 37 on the canister main body 2 side so as to cover the entire surface. A filter 48 made of nonwoven fabric or the like is provided in the fifth adsorption chamber 37 on the atmospheric port 33 side so as to cover the entire surface. A plate 49 where a plurality of communication holes are formed substantially evenly over the entire surface is provided on the filter 48 on the atmospheric port 33 side. The plate 49 is urged toward the port 32 by an urging member 50 such as a spring.

With the above configuration, gas containing the evaporated fuel that flows into the evaporated fuel treatment apparatus 1 from the tank port 6 flows into the fourth adsorption chamber 35 and the space chamber 36 after passing through the canister main body 2.

The flow of the evaporated fuel into the fifth adsorption chamber 37 can be delayed by diffusing the evaporated fuel in the space chamber 36. After that, the evaporated fuel passes through the fifth adsorption chamber 37 to be emitted into the atmosphere from the atmospheric port 33. In the meantime, the fuel component is adsorbed by the activated carbons 15a, 21a, and 22a and the adsorbents 38 and 39.

Meanwhile, in the purge control during the engine operation, the purge control valve is opened by the electronic control unit (ECU). Air is thereby sucked into the trap canister 3 from the atmospheric port 33 according to a negative pressure in the intake passage. The air flows in a direction opposite to the above direction to be supplied to the intake passage of the engine from the purge port 7. At this point, the fuel component adsorbed by the activated carbons 15a, 21a, and 22a and the adsorbents 38 and 39 is desorbed, and supplied to the engine together with the air.

Having the above configuration and structure, the evaporated fuel treatment apparatus 1 according to the present invention provides the following operations and advantages.

By mixing the first adsorbent 38 having a high percentage of effective pores and the second adsorbent 39 having a widespread pore distribution, the evaporated fuel treatment apparatus 1 can be provided with the characteristics of the respective adsorbents. By changing the mixture ratio, the characteristics of the evaporated fuel treatment apparatus 1 can be also easily changed.

The second adsorbent 39 having a relatively high pore volume with respect to the pores having higher adsorbability and lower desorbability on butane than the effective pores is used, and the percentage of the second adsorbent 39 is caused to increase toward the atmospheric port 33 side. According to the structure, the evaporated fuel component can be more effectively adsorbed and retained as compared to a case in which activated carbon according to the related art is used, and leakage of the evaporated fuel component from the evaporated fuel treatment apparatus 1 to the atmosphere can be suppressed. Blow-by reducing performance can be thereby improved.

The number of adsorption chambers and the shape thereof in the canister main body 2 are not limited to those shown in FIG. 1, and any number or shape may be employed.

Second Embodiment

Figure 3:
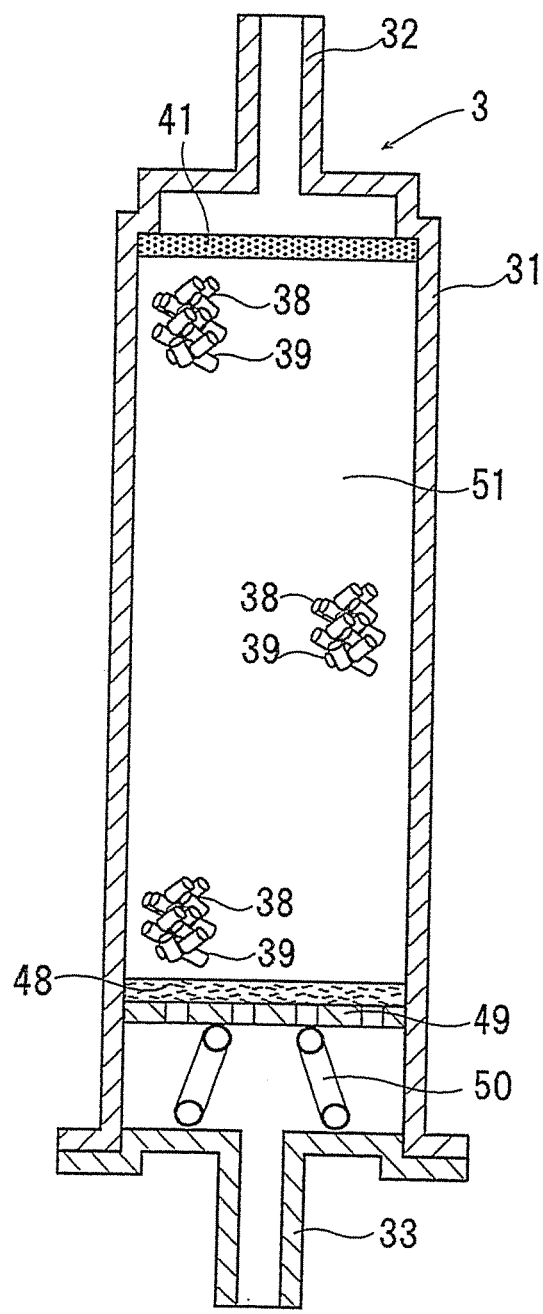
FIG. 3 is a schematic sectional view showing one example of a trap canister used in a second embodiment of the present invention.
Figure 4:
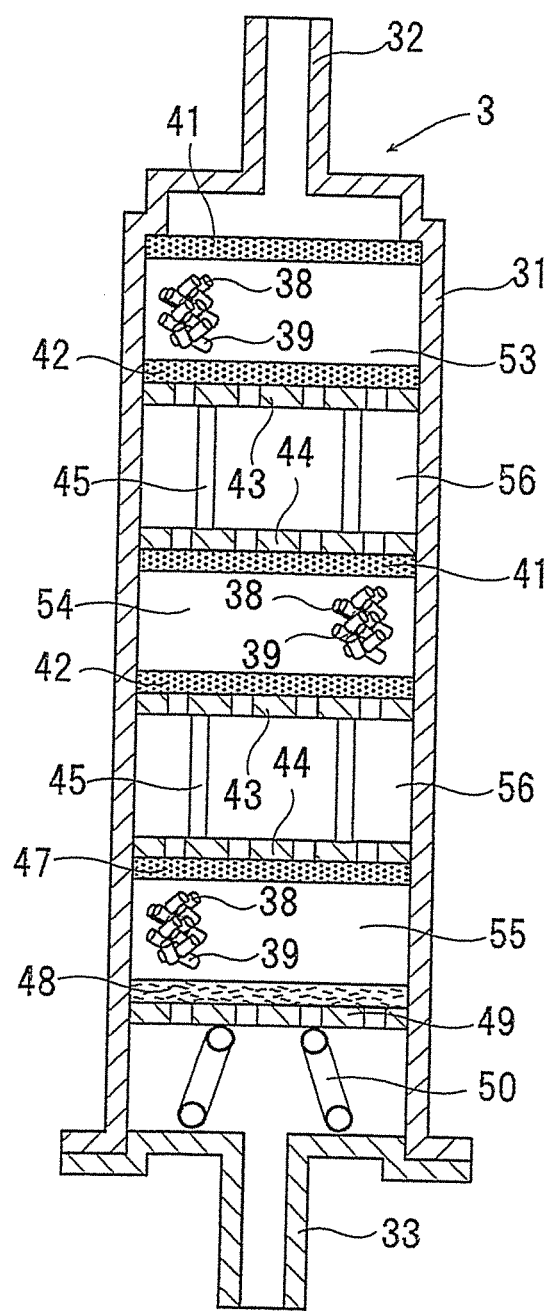
FIG. 4 is a schematic sectional view showing another example of the trap canister used in the second embodiment of the present invention.

In the first embodiment, the two adsorption chambers 35 and 37 are provided in the trap canister 3. However, one adsorption chamber 51 may be provided as shown in FIG. 3, or a plurality of adsorption chambers, e.g., three adsorption chambers 53, 54, and 55 may be formed in series as shown in FIG. 4 as the adsorption chamber provided in the trap canister 3. The number may be set to any value. Any shape may be also employed for the shape of the adsorption chamber. The respective adsorption chambers formed in the trap canister 3 are filled with the first adsorbent 38 and the second adsorbent 39 at a predetermined ratio in a similar manner to the above first embodiment.

When the plurality of adsorption chambers are formed in series in the trap canister 3, space chambers 56 and 56 are preferably formed between the adjacent adsorption chambers out of the fourth adsorption chamber 53, the fifth adsorption chamber 54, and the sixth adsorption chamber 55 as shown in FIG. 4.

The ratios between the first adsorbent 38 and the second adsorbent 39 in the respective adsorption chambers 53, 54, and 55 may be equal to or different from each other. However, the percentage of the second adsorbent 39 is preferably caused to increase toward the atmospheric port 33 side. For example, the fourth adsorption chamber 53 is filled with the first adsorbent 38 and the second adsorbent 39 at a ratio of 7 to 3, the fifth adsorption chamber 54 is filled with the first adsorbent 38 and the second adsorbent 39 at a ratio of 5 to 5, and the sixth adsorption chamber 55 is filled with the first adsorbent 38 and the second adsorbent 39 at a ratio of 7 to 3.

Since the structures of other elements are the same as those of the first embodiment, the description thereof is omitted.

In the second embodiment, the same advantages as those of the first embodiment can be also provided.

Moreover, as the number of adsorption chambers increases and the number of the space chambers 56 correspondingly increases, the diffusion of the evaporated fuel can be delayed. The blow-by reducing performance can be further improved.

Third Embodiment

A third embodiment differs from the first embodiment in that the adsorption chamber in the first embodiment filled with the mixture of the first adsorbent 38 and the second adsorbent 39 is also filled with a granulated material having no adsorption capacity on the evaporated fuel component, e.g., a resin pellet that is formed of resin into substantially the same shape as the activated carbon by mixing the granulated material together with the first adsorbent 38 and the second adsorbent 39. Although the percentage of the granulated material mixed therein may be set to any value, the entire volume of the granulated material is preferably set to 50% or less of the total volume of the first adsorbent 38, the second adsorbent 39, and the granulated material.

Since the structures of other elements are the same as those of the first and second embodiments, the description thereof is omitted.

In the third embodiment, the same advantages as those of the first and second embodiments can be also provided.

In recent years, adsorption performance is improved to improve the blow-by reducing performance on the evaporated fuel by reducing the sectional area of the adsorption chamber located closest to the atmospheric port side, extending the entire length thereof, and thereby increasing a contact time between the evaporated fuel and the activated carbon. However, when the sectional area decreases, there is a larger resistance to possibly adversely affect oil feed performance or the like.

To solve the problem, the granulated material is mixed together with the first adsorbent 38 and the second adsorbent 39 as described in the third embodiment. In this case, even when the sectional area, and the total amount of the adsorbents 38 and 39 are not changed, the length of the adsorption chamber can be extended, and the contact time between the adsorbents 38 and 39 and the fuel component can be increased. The blow-by reducing performance can be thereby improved.

Fourth Embodiment

In a fourth embodiment, the trap canister 3 as in the first to third embodiments is not provided, and the adsorption chamber filled with the mixture of the first adsorbent 38 and the second adsorbent 39, which is provided in the trap canister 3, is provided in the canister main body 2.

Figure 5:
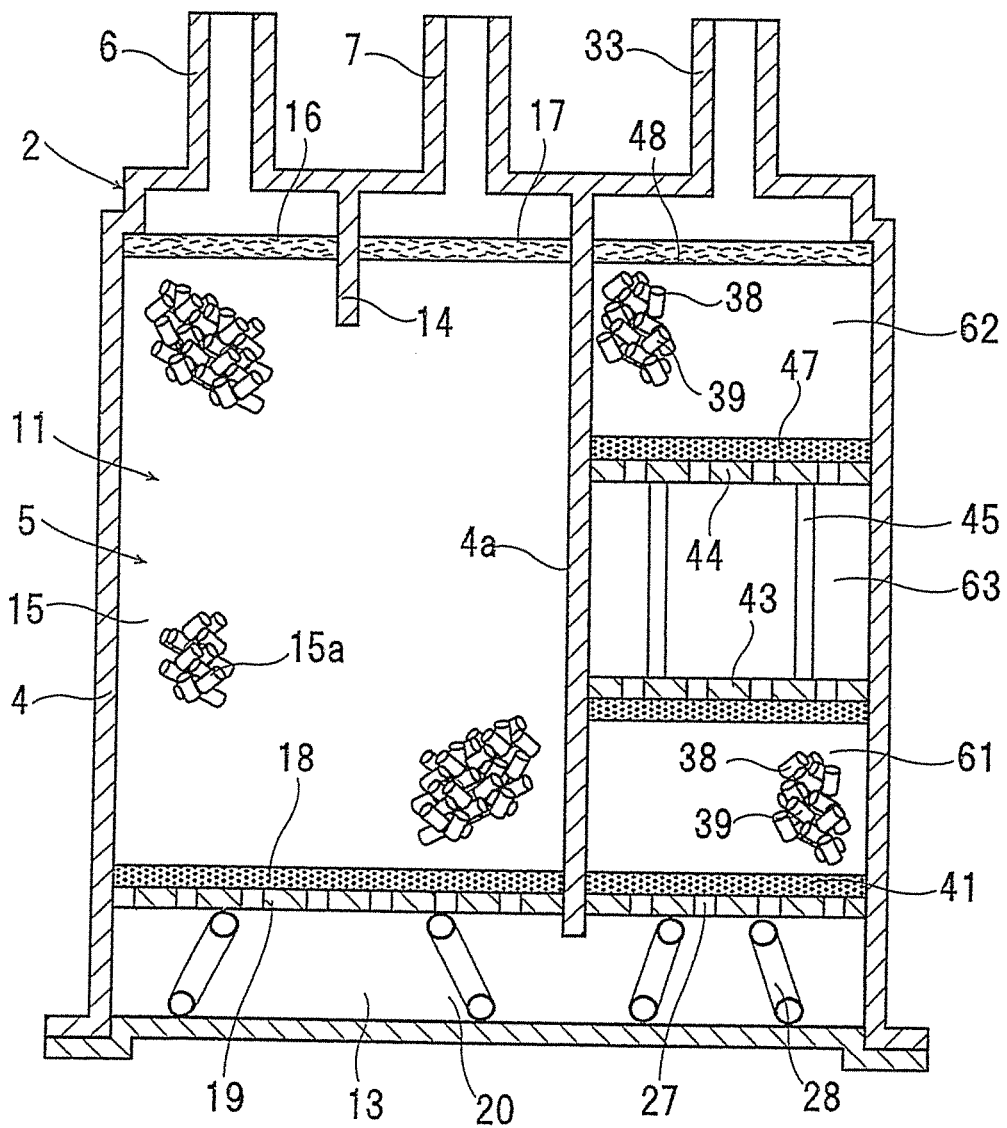
FIG. 5 is a schematic sectional view showing one example of an evaporated fuel treatment apparatus according to a fourth embodiment of the present invention.

FIG. 5 shows an example in which two adsorption chambers 61 and 62 filled with the mixture of the first adsorbent 38 and the second adsorbent 39 are provided in the sub-chamber 12 of the first embodiment, and a space chamber 63 filled with no adsorbent for adsorbing the evaporated fuel is provided between the adsorption chambers 61 and 62.

The granulated material may be also mixed together with the first adsorbent 38 and the second adsorbent 39 in the adsorption chambers 61 and 62 as in the third embodiment.

Since the structures of other elements are the same as those of the first to third embodiments, the description thereof is omitted.

In the fourth embodiment, the same advantages as those of the first to third embodiments can be also provided.

The foregoing disclosure of specific embodiments is intended to be illustrative of the broad concepts comprehended by the invention.

The invention claimed is:

1. An evaporated fuel treatment apparatus comprising an atmospheric port side and at least one adsorption chamber, the one adsorption chamber at the atmospheric port side and filled with a first adsorbent and a second adsorbent that adsorb and desorb a fuel component of evaporated fuel,
   wherein the first adsorbent and second adsorbent are mixed together in the one adsorption chamber,
   wherein the first adsorbent has a higher pore volume than the second adsorbent with respect to effective pores that effectively adsorb and desorb a low-boiling fuel component, and
   the first adsorbent has a lower pore volume than the second adsorbent with respect to pores smaller than the effective pores and having higher adsorbability and lower desorbability on butane than the effective pores.

2. The evaporated fuel treatment apparatus according to claim 1, further comprising at least one adsorption chamber filled with an adsorbent that adsorbs and desorbs a fuel component of evaporated fuel.

3. The evaporated fuel treatment apparatus according to claim 2, wherein the adsorption chamber filled with the mixed first adsorbent and the second adsorbent and provided at the atmospheric port side is filled with the first adsorbent, the second adsorbent, and further granulated material having no adsorption capacity on the fuel component.

4. The evaporated fuel treatment apparatus according to claim 2, wherein a plurality of adsorption chambers are provided as said at least one adsorption chamber filled with the mixed first adsorbent and the second adsorbent, the adsorption chambers are sequentially arranged in series, and a space chamber not filled with the adsorbent is provided between adjacent adsorption chambers in the series of the adsorption chambers.

5. The evaporated fuel treatment apparatus according to claim 1, wherein the first adsorbent has a lower pore volume than the second adsorbent with respect to pores larger than the effective pores.

6. The evaporated fuel treatment apparatus according to claim 1, wherein coal-based activated carbon is used as the first adsorbent, and wood-based activated carbon is used as the second adsorbent.

7. The evaporated fuel treatment apparatus according to claim 1, wherein the evaporated fuel treatment apparatus comprises a canister main body and a trap canister connected to a port of the canister main body on an atmosphere side, and
   said at least one adsorption chamber filled with the mixed first adsorbent and the second adsorbent that adsorb and desorb the fuel component of the evaporated fuel is provided in the trap canister.

8. An evaporated fuel treatment apparatus comprising at least one adsorption chamber filled with a first adsorbent and a second adsorbent that adsorb and desorb a fuel component of evaporated fuel,
   wherein the first adsorbent has a higher pore volume than the second adsorbent with respect to effective pores that effectively adsorb and desorb a low-boiling fuel component, and
   the first adsorbent has a lower pore volume than the second adsorbent with respect to pores smaller than the effective pores and having higher adsorbability and lower desorbability on butane than the effective pores,
   the apparatus further comprising at least one adsorption chamber filled with an adsorbent that adsorbs and desorbs a fuel component of evaporated fuel,
   wherein said at least one adsorption chamber filled with the first adsorbent and the second adsorbent is provided on an atmospheric port side,
   wherein a plurality of adsorption chambers are provided as said at least one adsorption chamber filled with the first adsorbent and the second adsorbent, and said adsorption chambers have different mixture ratios between the first adsorbent and the second adsorbent such that a percentage of the second adsorbent mixed therein increases toward the atmospheric port side.

* * * * *